Patented Apr. 14, 1942

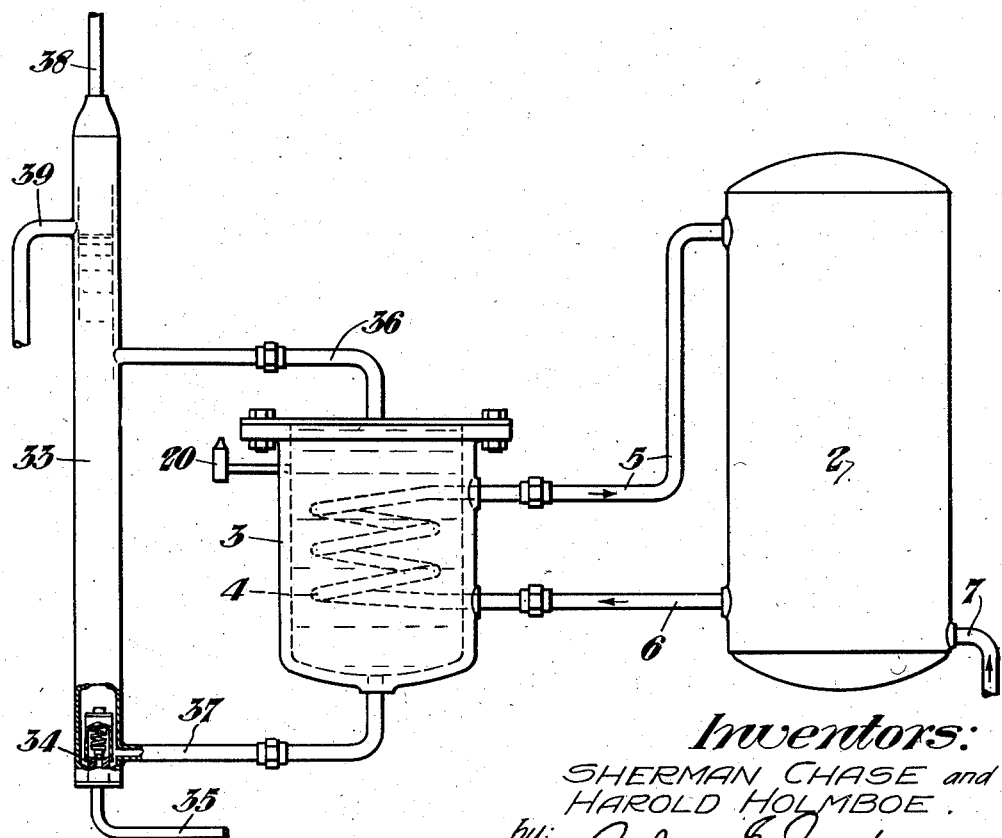
Inventors:
SHERMAN CHASE and
HAROLD HOLMBOE.
by John E. Jackson
their Attorney.

2,280,028

UNITED STATES PATENT OFFICE 2,280,028

APPARATUS FOR HEATING LIQUIDS

Sherman Chase, Evergreen Park, and Harold Holmboe, Chicago, Ill.

Application April 13, 1939, Serial No. 267,710

2 Claims. (Cl. 261—15)

This invention relates to the heating of liquids, and, particularly, to an improved apparatus for heating liquids under pressure, such as water for storage in a tank for subsequent use.

In the heating and storage of hot liquids under pressure in a heated liquid storage tank, vapor pressures corresponding to the temperature of the hot liquid are naturally present and, in the case where the storage tank is an isolated closed container, such as is commonly used for heating hot water, additional heating of the liquid beyond a certain temperature frequently causes an internal vapor pressure in such tanks far in excess of the initial pressure therein and the pressure for which the tank was designed to withstand, often resulting in the issuing of flash vapors therefrom with an explosive violence upon the drawing of a portion of the liquid therefrom, or, oftentimes, in the failure of the tanks and an explosion thereof, endangering human life.

Heretofore, it has been the practice to safeguard against such explosions by providing hot liquid storage tanks with any one of the number of various well-known types of temperature and pressure relief devices, such as a thermostatic relief valve, fusible plug, pop valve, bursting disk, and the like. While such safety devices are satisfactory and practical, instead of depending solely on such relieving devices to release such pressures in the storage tanks, it is the purpose of the present invention to eliminate any undue pressure whatsoever therein by dispensing with the source of such danger, namely, the overheating of the liquid.

It is one of the objects of the present invention to eliminate the cause of the explosions of heated liquid storage tanks by limiting automatically the maximum temperature to which the stored liquid under pressure may be heated.

It is another object of the invention to provide an improved apparatus for heating liquids in storage tanks under pressure which will not heat the liquid under pressure above its boiling or vapor forming point, thereby eliminating not only the danger of explosion of the tank but also the formation and presence of flash vapors when the heated liquid is drawn therefrom for use.

According to the present invention, the stored liquid under pressure is heated by means of a heat exchanger or thermotank, wherein the heat is transferred in the heat exchanger from a secondary heated liquid or fluid which is heated from an initial source. The heat exchanger is connected to a flash tank which is maintained at atmospheric pressure or at a controlled pressure by means of an exhaust to the atmosphere or an exhaust to a condenser maintained at a controlled pressure. To those skilled in the art, it will become apparent that when the temperature of the stored fluid, that is, the primary fluid to be heated, reaches the boiling point of the secondary heating liquid, the vapor from the secondary liquid will be trapped in the heat exchanger or thermo-tank and continued application of heat to the secondary liquid or the overfiring thereof will result in release of vapor accompanied by the secondary liquid to the flash tank. It will thus be seen that no further rise in the temperature of the primary liquid can then take place, and, further, by altering the composition of the secondary liquid and its boiling point, the stored liquid can then be heated to a temperature within a predetermined temperature range.

Accordingly, it is a further object of the invention to provide an improved, simple and inexpensive method of and apparatus for heating liquids under pressure to a uniform temperature which can be easily and conveniently controlled and maintained.

Various other objects and advantages of this invention will be more apparent in the course of the following specification and will be particularly pointed out in the appended claims.

In the accompanying drawing there is shown, for the purpose of illustration, an embodiment which our invention may assume in practice.

In the drawing:

The single figure of the drawing shows an elevation partly in section of one type of apparatus that may be used in the practice of the present invention.

Referring more particularly to the drawing, there is shown for the purpose of illustration a storage tank or container 2 in which the primary liquid to be heated is stored. There is positioned preferably in the immediate vicinity of the storage tank 2 a heat exchanger or thermotank 3 having a pipe coil 4 arranged therein. The upper end of the pipe coil 4 is connected to the upper end of the storage tank 2 by means of a pipe 5 and the lower end of the pipe coil 4 is connected to the lower end of the tank 2 by means of the pipe 6. The water or the primary liquid to be heated is delivered into the storage tank initially by means of the pipe 7 positioned adjacent the bottom thereof. It will also be understood that there is suitable means, such as a pipe connection or valve (not shown), provided for withdrawing the liquid from the storage tank for use.

According to the present invention, there is arranged also preferably in the immediate vicinity of the storage tank a vertically extending tubular member 33 which is preferably in the form of a large diameter pipe in which there is disposed a secondary heating liquid. The vertically extending member 33 is connected to the thermotank 3 at the top thereof by means of a pipe 36 and the bottom of the tubular member 33 is connected to the thermotank at the bottom thereof by means of a pipe 37. There is associated preferably with the heat exchanger or thermotank 3, a suitable vent 20 for exhausting air or gases therefrom. There is also connected to the bottom of the tubular member 33 preferably a pipe 35 which is connected to a suitable source of steam supply (not shown) and which is adapted to convey steam or any other suitable heating medium into the tubular member 33. There is positioned in the bottom of the tubular member 33, directly opposite the pipe 35, preferably a thermostatic element 34 which controls the amount of steam or heating medium entering the circulatory system from the pipe 35. At the top of the tubular member 33 there is arranged preferably a connection 38 for venting the member 33 to the atmosphere. Above the connection 36 there is arranged with the tubular member 33 an overflow preferably in the form of a pipe connection 39 for the purpose of discharging any excess water or secondary heating liquid from the tubular member and the circulatory system.

It will be understood that the steam or other heating medium enters the curatory system at the bottom of the tubular member 33 through the pipe 35, thereby heating the secondary heating liquid therein by convection currents. The secondary heating liquid is circulated by the thermosiphon principle through the pipe 36 into the heat exchanger 3 and around the pipe coil 4 arranged therein. The cooled secondary liquid is then delivered back to the bottom of the tubular member 33 by means of pipe 37 to be reheated therein. In case the secondary heating liquid is heated to its boiling point, the water vapor or steam will pass up through the tubular member 33 and escape through the pipe 38 to the atmosphere or, if desired, to a sewer.

It will be seen that the secondary circulating medium may be held at a predetermined temperature by regulating the temperature at which the thermostatic element 34 opens to emit the steam thereinto. It will be apparent that the maximum temperature to which the primary liquid in the storage tank can be heated is 212° F., or to its boiling point, due to the fact that the secondary circulating liquid is always maintained at atmospheric pressure, in that the tubular member 33, which is part of the circulatory system of the secondary heating liquid, is vented to the atmosphere.

It will be understood that the secondary heating liquid may be heated electrically by means of a resistance unit arranged in the bottom of the tubular member 33, as well as by steam, fuel gas, or any other suitable firing means, as desired, and as is practical.

While we have shown and described one specific embodiment of our invention, it will be understood that this embodiment is merely for the purpose of illustration and description and that various other forms may be devised within the scope of our invention, as defined in the appended claims.

We claim:

1. Apparatus for heating a liquid including, in combination, a thermotank consisting of a hollow body member with a pipe coil arranged therein through which a primary liquid to be heated is adapted to pass, a vertically arranged tubular member in which there is adapted to be disposed a secondary heating liquid, means arranged adjacent the bottom of said tubular member for conveying a heating medium into the same for heating said secondary heating liquid therein, a thermostatic element arranged with said last mentioned means for controlling the amount of the heating medium entering said tubular member, means arranged with said tubular member for conveying vapor gases from the top portion thereof, means interconnecting the bottom portion of said tubular member at a point adjacent the thermostatic element with the bottom portion of said thermotank, and means interconnecting the top portion of said thermotank and said tubular member at a point above said last mentioned connection, said secondary heating liquid adapted to be heated in said vertically arranged member and adapted to pass by the thermosiphon principle into the top portion of the thermotank through the top connection, down and around the coil in said thermotank so as to heat the primary liquid passing therethrough, out therefrom through the bottom connection and back into the vertically arranged member.

2. Apparatus for heating a liquid including, in combination, a thermotank consisting of a hollow body member with a pipe coil arranged therein through which a primary liquid to be heated is adapted to pass, a vertically arranged tubular member in which there is adapted to be disposed a secondary heating liquid, means arranged adjacent the bottom of said tubular member for heating said secondary heating liquid therein, means arranged with said tubular member for conveying vapor gases from the top portion thereof, means interconnecting the bottom portion of said tubular member with the bottom of said thermotank, means interconnecting the top portion of said thermotank and said tubular member at a point above said last mentioned connection, said secondary heating liquid adapted to be heated in said vertically arranged member and adapted to pass by the thermosiphon principle into the top portion of the thermotank through the top connection, down and around the coil in said thermotank so as to heat the primary liquid passing therethrough, out therefrom through the bottom connection and back into the vertically arranged member, and means arranged in the top portion of said tubular member above said last mentioned connection for discharging any excess secondary heating liquid from the tubular member and the secondary circulatory system.

SHERMAN CHASE.
HAROLD HOLMBOE.